Sept. 1, 1942.                G. M. FLANAGAN                2,294,657
                                SERVING DISH
                             Filed Oct. 16, 1940
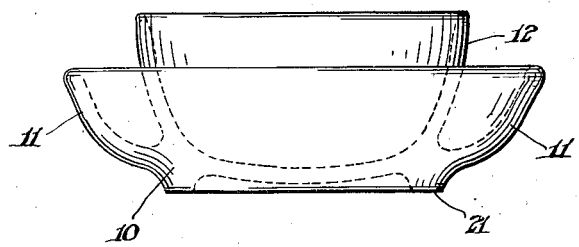
Fig.1.
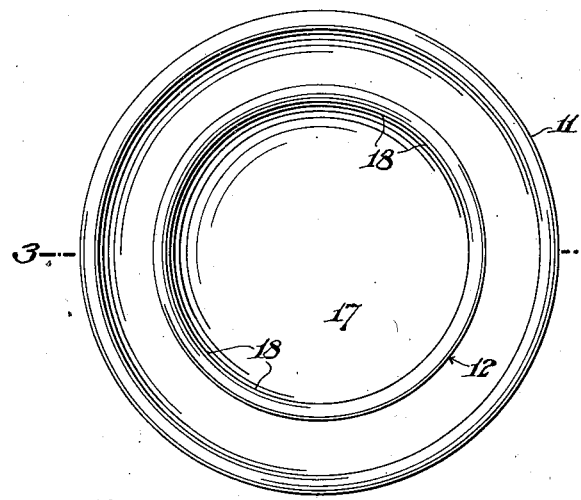
Fig.2.
Fig.3.
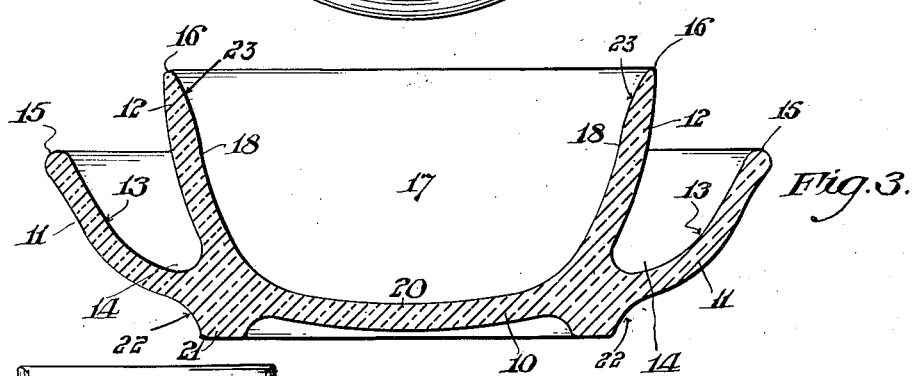
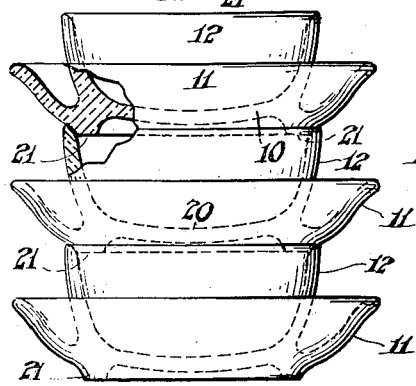
Fig.4.
Inventor:
Gertrude M. Flanagan,
By Barr, Borden & Fox
Attorney.

Patented Sept. 1, 1942

2,294,657

UNITED STATES PATENT OFFICE 2,294,657

SERVING DISH

Gertrude M. Flanagan, Philadelphia, Pa.

Application October 16, 1940, Serial No. 361,341

2 Claims. (Cl. 65—15)

The present invention relates to serving dishes and more particularly to a novel unitary bowl and plate.

In the serving of foods in dishes of bowl shape it has heretofore been customary to accompany each bowl with a separate plate, the latter serving to protect the table from liquid or food spilling out of the bowl. Where such are used in resturants it means the handling of two separate dishes, the washing of two separate dishes, the inconvenience in handling two separate dishes, and the added cost for replacing broken dishes. In some instances, soup for example, is brought to the table in a cup and there poured into a bowl resting upon a separate plate, making three separate dishes necessary. Furthermore separate bowls and cups are difficult to store, take up an undue amount of space, and introduce an added factor to breakage generally.

Some of the objects of the present invention are to provide an improved bowl for serving foods which is particularly adapted for use with modern canned soup; to provide a serving bowl wherein a plate forms a component part thereof; to provide a serving bowl, the cost of which is less than for dishes now generally used; to provide a serving bowl which in use reduces the likelihood of breakage and consequently the cost of replacements; to provide a serving bowl which can be stored with ease and with a minimum of storing space; to provide a bowl which eliminates the use of a separate plate when in use; to provide a bowl which can be conveniently stacked either for storing or for serving; and to provide other improvements as will hereinafter appear.

In the accompanying drawing Fig. 1 represents an elevation of a serving bowl embodying one form of the present invention; Fig. 2 represents a top plan of the same; Fig. 3 represents an enlarged section on line 3—3 of Fig. 2; and Fig. 4 represents an elevation of a plurality of the bowls in nested assembly when out of use.

Referring to the drawing one form of the present invention consists of a base 10 of generally circular contour having a lower circumferentially arranged flange 11, and an upper circumferentially arranged wall 12, both said flange 11 and wall 12 being integral with the base 10. The flange 11 is upwardly and outwardly flared at such an angle to the horizontal as will furnish a stable support for any articles, such as crackers, or other edible products, spoons or utensils, when placed thereon. Preferably the supporting face 13 of the flange 11 is somewhat concave having an easy smooth curve merging reversely into the outer wall 12 at its base. This wall 12 rises from the base 10 with a slight outward incline to the vertical forming with the flange 11, an annular groove 14 having a relatively wide curved concave throat as a bottom. The top edge 15 of the flange 11 is rounded and lies in a horizontal plane below the like plane of the rounded edge 16 of the wall 12. It should also be noted that the diameter of the flange at its top edge 15 is greater than the diameter of the top edge 16 of the wall 12, and consequently any overflow from the bowl 17, which is formed by the wall 12, will be caught by the flange 11.

For retaining liquids, such as soup, and for otherwise making it relatively easy to insert a spoon into the bowl to scoop out its contents, the inner face 18 of the wall 12 converges toward the base as an almost vertical concave surface which at its base sweeps into a horizontally disposed slightly convex floor 20. The diameter of this floor 20 is sufficiently large to permit a spoon, or other utensil, to readily follow its contour and be removed from the bowl filled with soup or other edible contained within the bowl.

From the foregoing it will be seen that a unitary bowl and plate has been devised wherein a serving of soup can be made with a serving of crackers around the outside of the bowl and arranged in the groove 14. Also the spoon used can rest stably in the same groove. While primarily the invention is for use with soups or other liquids, it is obvious that many edible products can be served with equal cleanness and efficiency.

In order that a number of bowls embodying the invention can be safely stacked one above another without danger of lateral displacement, the base 10 is provided with a circular rib 21 projecting from its bottom and concentric with respect to the vertical axis of the bowl. The outer diameter of this rib 21 is just enough less than the diameter of the mouth of the bowl 17 as to fit snugly therein when one bowl unit is superposed upon another. This nesting is made a positive interlocking of one bowl to another by forming the outer circumferential face 22 of the rib 21 as an outwardly flared concave curve, the contour of which is complemental to the inner convex curved face 23 adjacent the edge 16. In this way one unit partially telescopes with another and results in a stable nesting of all stacked units. While this nesting is particularly useful for stacking the units when not in use, it is also an important feature when the units are in use since a number of filled bowls can be stacked and thus served by making but one trip from the place of supply to the place of use.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A dish for serving soup, comprising a base having an upper, substantially horizontal floor, a wall bounding said floor and joined thereto by a concave area merging into said floor, said wall rising substantially vertically from said area to form with said base a serving bowl having a substantially greater width than depth to permit a spoon to scoop freely across said floor, and a flange integral with said base and rising at an acute angle therewith to encircle said wall to form an annular groove for supporting articles related to the contents of said bowl.

2. A dish for serving soup, comprising a base having an upper, substantially horizontal floor, a wall bounding said floor and joined thereto by a concave area merging into said floor, said wall rising substantially vertically from said area, to form with said base a serving bowl having a substantially gerater width than depth to permit a spoon to scoop freely across said floor, said wall terminating in a marginal edge having an inner face of convex contour to reduce the angle of the handle of a spoon with respect to said floor, a flange integral with said base and rising at an acute angle therewith to encircle said wall to form an article receiving annular groove, and an annular rib on the bottom of said base having an encircling concave outer face concentric to said inner convex face, the diameter of said rib being such that said rib can seat within the marginal edge of a like dish to nest one dish upon another.

GERTRUDE M. FLANAGAN.